United States Patent
Havinis et al.

(10) Patent No.: US 6,311,069 B1
(45) Date of Patent: *Oct. 30, 2001

(54) SYSTEM AND METHOD FOR ALERTING A MOBILE SUBSCRIBER BEING POSITIONED

(75) Inventors: Theodore Havinis, Plano; David Boltz, Garland, both of TX (US)

(73) Assignee: Ericsson Inc., Research Triangle Park, NC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,715

(22) Filed: Mar. 18, 1999

(51) Int. Cl.[7] ........................ H04Q 7/20
(52) U.S. Cl. .................. 455/456; 455/432; 455/414
(58) Field of Search .................. 455/456, 457, 455/432, 414; 342/457

(56) References Cited

U.S. PATENT DOCUMENTS

| | | | |
|---|---|---|---|
| 6,009,091 | * 12/1999 | Stewart | 370/342 |
| 6,049,718 | * 4/2000 | Stewart | 455/456 |
| 6,138,003 | * 10/2000 | Kingdon | 455/410 |

* cited by examiner

Primary Examiner—Nguyen T. Vo
Assistant Examiner—James K Moore
(74) Attorney, Agent, or Firm—Jenkens & Gilchrist, P.C.

(57) ABSTRACT

A telecommunications system and method is disclosed for notifying a mobile subscriber being positioned of the received positioning request, and preferably, the identity of the requesting Location Application (LA) in order to enhance the privacy of the mobile subscriber. A request message, which contains a similar indicator to that of the SETUP message in mobile-terminating calls, is sent by the serving Mobile Switching Center (MSC) to the mobile subscriber to cause an alerting tone, e.g., ringing or beeping, on the Mobile Station (MS) of the mobile subscriber. The mobile subscriber can accept or reject the positioning request based upon the LA identity displayed on the MS.

24 Claims, 7 Drawing Sheets

SYSTEM AND METHOD FOR ALERTING A MOBILE SUBSCRIBER BEING POSITIONED

BACKGROUND OF THE PRESENT INVENTION

Field of the Invention

The present invention relates generally to telecommunications systems and methods for positioning a mobile subscriber within a cellular network, and specifically to alerting a mobile subscriber that a request for a positioning of that mobile subscriber has been received.

BACKGROUND AND OBJECTS OF THE PRESENT INVENTION

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

Figure 1:
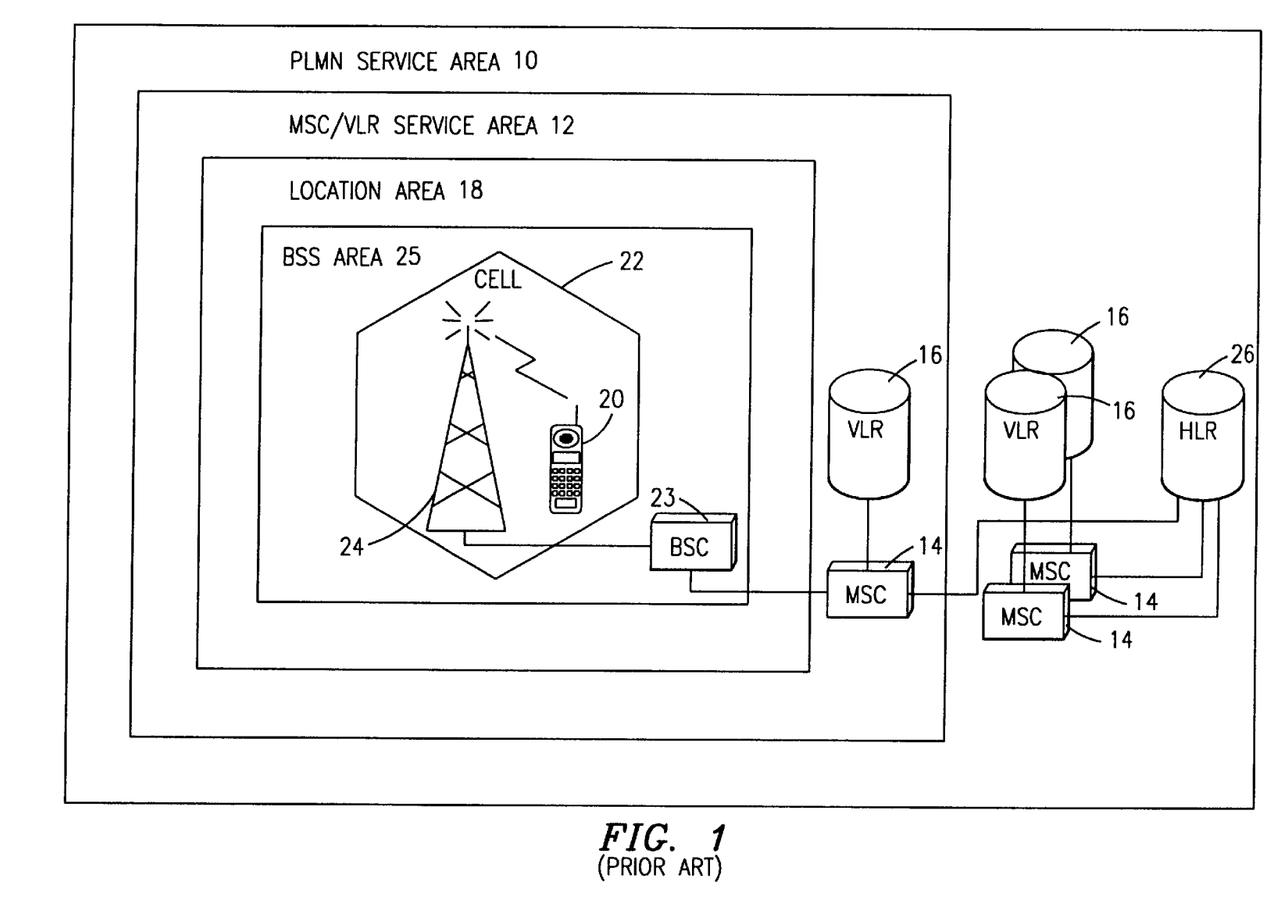
FIG. 1 is a block diagram illustrating a conventional wireless telecommunications system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC 14 provides a circuit switched connection of speech and signaling information between a Mobile Station (MS) 20 and the PLMN 10. The MSC/VLR areas 12, in turn, include a plurality of Location Areas (LA) 18, which are defined as that part of a given MSC/VLR area 12 in which the MS 20 may move freely without having to send update location information to the MSC 14 that controls the LA 18. Each LA 18 is divided into a number of cells 22. The MS 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC 14, integrated with the MSC 14, or alternatively can service multiple MSCs 14, the latter of which is illustrated in FIG. 1.

Determining the geographical position of an MS 20 within a cellular network 10 has recently become important for a wide range of applications. For example, location services (LCS) may be used by transport and taxi companies to determine the location of their vehicles. In addition, for emergency calls, e.g., 911 calls, the exact location of the MS 20 may be extremely important to the outcome of the emergency situation. Furthermore, LCS can be used to determine the location of a stolen car, for the detection of home zone calls, which are charged at a lower rate, for the detection of hot spots for micro cells, or for the subscriber to determine, for example, the nearest gas station, restaurant, or hospital, e.g., "Where am I" service.

Figure 2:
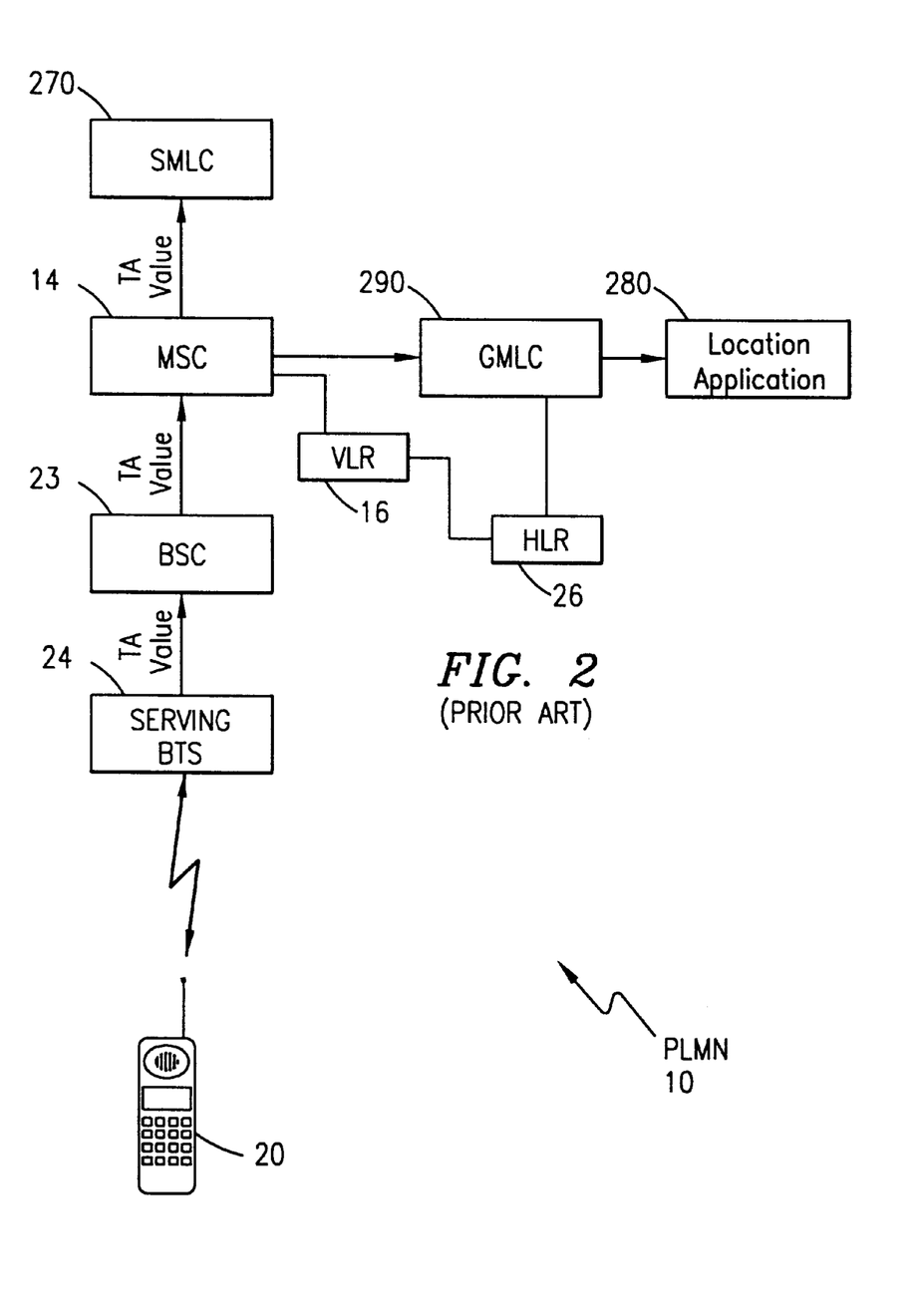
FIG. 2 is a block diagram illustrating a sample conventional positioning of a mobile station.

As can be seen in FIG. 2 of the drawings, upon a network positioning request, the MSC 14 obtains, from the serving BTS 24 and BSC 23, a Timing Advance (TA) value, which corresponds to the amount of time in advance that the MS 20 must send a message in order for the serving BTS 24 to receive it in the time slot allocated to that MS 20. The TA value, in turn, provides location information regarding the MS 20 location. This is due to the fact that when a message is sent from the MS 20 to the BTS 24, there is a propagation delay, which depends upon the distance between the MS 20 and the BTS 24. The TA values are expressed in bit periods, and can range from 0 to 63, with each bit period corresponding to approximately 550 meters between the MS 20 and the BTS 24.

This TA value is forwarded to a Serving Mobile Location Center (SMLC) 270 for use in assisting the calculation of the geographical location of the MS 20.

It should be noted that the SMLC 270 can use a number of different positioning mechanisms, including, but not limited to, Time of Arrival (TOA), Enhanced Observed Time Difference (E-OTD) and Global Positioning System (GPS). After the SMLC 270 calculates the MS 20 location, this location can be sent to a Location Application (LA) 280 that requested the positioning. It should be noted that the requesting LA 280 could be located within the MS 20 itself, within the MSC 14 or could be an external node, such as an Intelligent Network (IN) node. If the LA 280 is not within the MS 20 or within the MSC 14, the location information is sent to the requesting LA 280 via the MSC 14 and a Gateway Mobile Location Center (GMLC) 290.

Existing technology can provide mobile subscribers with the ability to prevent LAs 280 from positioning them in order to protect their privacy. However, in some cases, it is necessary for the specific LA 280 to position the MS 20 regardless of the privacy settings of the particular subscriber. For example, when the LA 280 is an emergency center or a law enforcement agency, the community interest in positioning the MS 20 outweighs the subscriber's need for privacy. In this case, the privacy settings of the subscriber will need to be overridden in order for the emergency center or law enforcement agency to position the MS 20. In addition, LAs 280 may need to have the ability to override other location settings established by the subscriber. Thus, a Privacy Override Indicator (POI) (not shown) can be provided by network operators to allow an LA 280 to override the subscriber's privacy settings in order to obtain the location of the mobile subscriber.

The POI is typically assigned on an individual LA 280 basis by the GMLC 290 during the registration of the LA 280 at the GMLC 290 associated with the PLMN 10 that the LA 280 is located in. Normally, commercial-type LA's 280 are not allowed to override the subscriber's privacy settings, e.g., the assigned value of the POI is "not override." However, certain specific LA's 280, such as law enforcement or E-911, which must be capable of positioning a subscriber regardless of the subscriber's privacy settings, can be assigned a POI with the value "allowed to override subscriber's privacy settings." It should be noted that when the subscriber is roaming, law enforcement LA's 280 will need, in addition to the POI with the value "allowed to override subscriber's privacy settings," a court order in order to be able to override the mobile subscriber's privacy settings.

Furthermore, even though a mobile subscriber has established privacy settings, the mobile subscriber may want to allow certain other subscribers or LAs 280 to have the ability to position the mobile subscriber regardless of the mobile subscriber's privacy settings. Such other subscribers could be, for example, the mobile subscriber's family or member (s) of a particular group, such as, e.g., in the case where the subscriber is an employee of a taxi company, the operations center or the mobile subscriber's manager. For those cases, the mobile subscriber may also want to put limits on the ability of those other subscribers or LA's 280 to position him or her. For example, the mobile subscriber may only want to allow certain LA's 280 to be able to position the mobile subscriber during certain hours or minutes of the day, certain days of the week or certain days, weeks or months of the year. In addition, the mobile subscriber may want to limit the number of allowable repetitive positionings by a particular subscriber or LA 280 per hour, day, week or year.

Therefore, each mobile subscriber can define a Subscriber Location Privacy Profile (SLPP) (not shown), which contains a list of preferred subscribers or LA's 280 that have permission to position the mobile subscriber. The SLPP can also define the conditions under which each of the preferred LA's 280 can position the mobile subscriber. For example, the mobile subscriber can limit the positioning by a particular preferred LA 280 to only certain hours of the day, certain days of the week and/or certain weeks of the year, and can limit the number of times that particular preferred LA 280 can request positioning of the mobile subscriber during those allowed times. The SLPP can preferably be connected to the mobile subscriber's main subscription record in the HLR 26 and can be downloaded to the VLR 16 together the rest of the subscription information when the MS 20 is within the MSC/VLR area 12 (shown in FIG. 1).

Preserving the mobile subscriber's privacy is an extremely important factor in determining whether or not location services shall be a successful feature for the mobile subscriber. In all cases, if the mobile subscriber does not wish to be positioned, the network must be able to preserve the mobile subscriber's choice not to reveal his location to a requesting LA 280. This is true even if the mobile subscriber has defined an associated SLPP, and the requesting LA 280 is allowed to position the mobile subscriber.

It is, therefore, an object of the present invention to notify the mobile subscriber that he/she is being positioned in order to enhance the privacy of the mobile subscriber.

SUMMARY OF THE INVENTION

The present invention is directed to telecommunications systems and methods for notifying a mobile subscriber being positioned of the received positioning request, and preferably, the identity of the requesting Location Application (LA) in order to enhance the privacy of the mobile subscriber. A request message, which contains a similar indicator to that of the SETUP message in mobile-terminating calls, is sent by the serving Mobile Switching Center (MSC) to the mobile subscriber to cause an alerting tone, e.g., ringing or beeping, on the Mobile Station (MS) of the mobile subscriber. The mobile subscriber can either accept or reject the positioning request based upon the LA identity displayed on the MS.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 3:
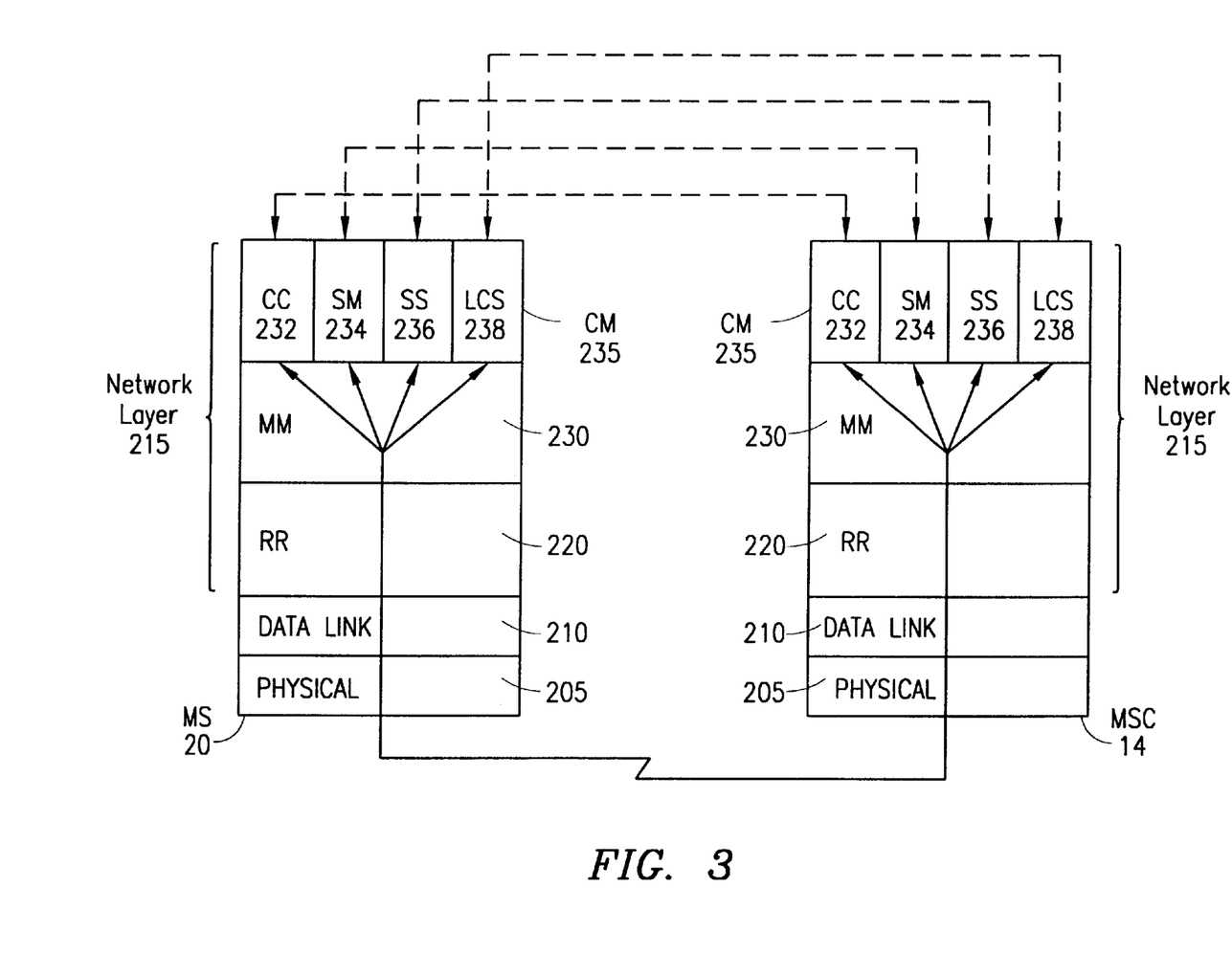
FIG. 3 is a block diagram illustrating the conventional implementation of the Location Services (LCS) layer in the Connection Management sub-layer of the cellular network in accordance with Open System Interconnection (OSI) standards.

With reference now to FIG. 3 of the drawings, currently, when a target Mobile Station (MS) 20 is being positioned, the MS 20 is not always able to make or receive calls, send or receive short messages or activate other supplementary services. Using the Open Systems Interconnection (OSI) model, which was developed by the International Standards Organization (ISO) in 1982, the inability of the MS 20 to engage in other activities while being positioned can be explained by describing the cellular network as several functional layers arranged in hierarchical form. These consist of the physical layer 205, the data link layer 210 and the network layer 215, which are on both the network side (MSC 14) and the terminal side (MS 20). The network layer 215 is composed of three sublayers: Radio Resource (RR) 220, Mobility Management (MM) 230 and Connection Management (CM) 235.

At present, the CM layer 235, which is the highest layer, controls three separate transaction types: end-to-end call control (CC layer) 232, short message handling delivery (SM layer) 234 and call independent handling of supplementary services (SS layer) 236. It is possible for a mobile subscriber to establish several CM-connections 235, using the same MM 230 and RR-connection 220. Therefore, several telecommunications services can be provided at one time, and the network can change between different services if necessary.

Thus, any transaction may be established in parallel to any combination of other transactions. However, for a given RR-connection 220, MM-connections 230 can only be established once for each of the transaction types 232, 234 and 236. That implies that, if LCS were to be defined as part of either the CC layer 232, SM layer 234 or SS layer 236, it would be impossible to offer an LCS transaction at the same time as another transaction if both transactions belonged to the same transaction type (CC 232, SS 234 or SM 236).

Therefore, as proposed in patent application Ser. No. 09/151,039 to Havinis et al., which is hereby incorporated by reference, a new type of layer, called the LCS layer 238, can be defined within the CM sublayer 235. The LCS layer 238 is in parallel with the CC 232, SM 234 and SS 236 layers of the CM sublayer 235. Therefore, an LCS transaction can be performed in parallel to any other existing transaction for the same mobile subscriber at any given time.

Figure 4:
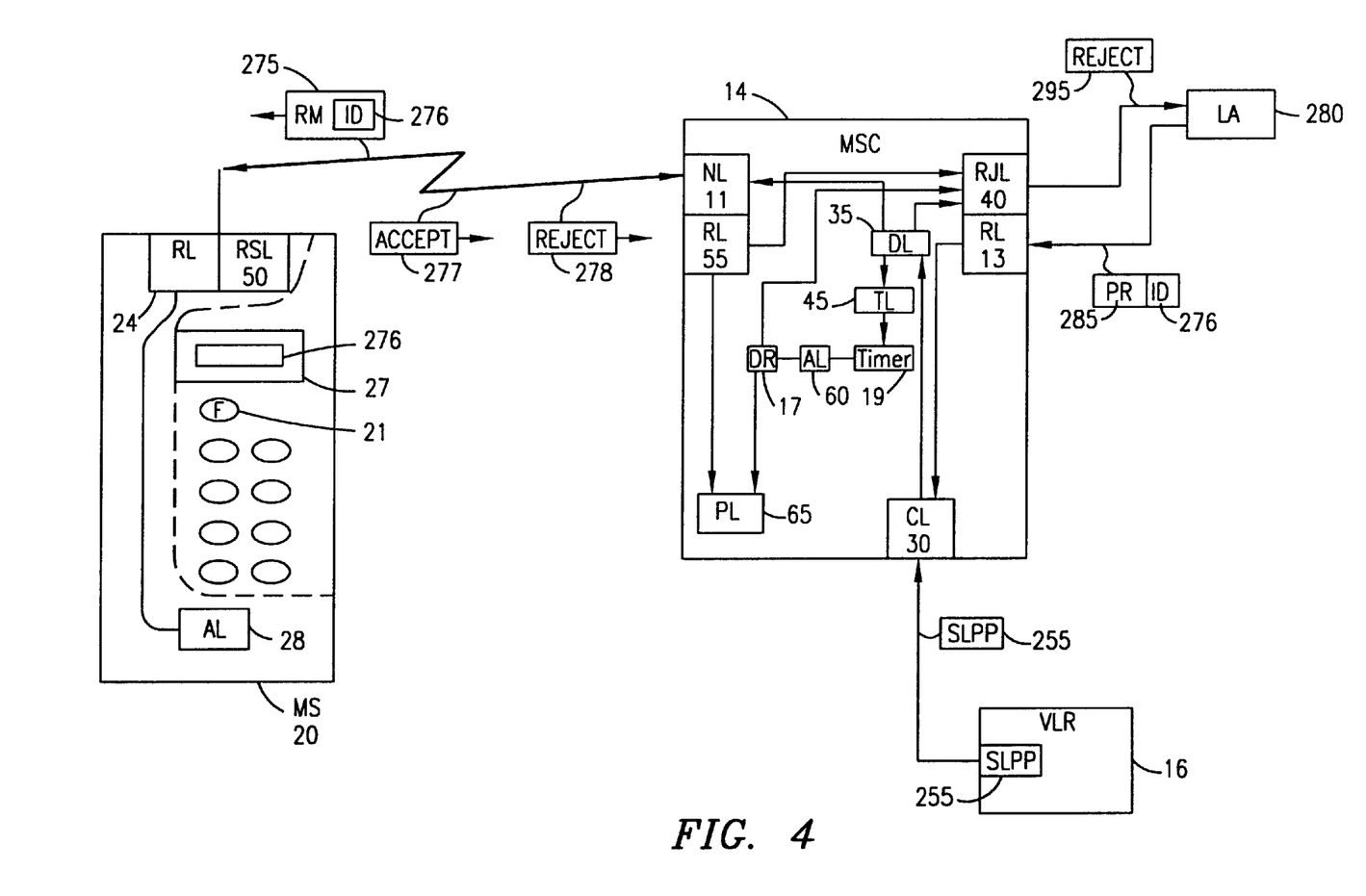
FIG. 4 is a block diagram illustrating the sending of a notification message to a mobile station being positioned in accordance with preferred embodiments of the present invention.

With reference now to FIG. 4 of the drawings, when a positioning request 285 for a target MS 20 is received by receiving logic 13 within a serving Mobile Switching Center (MSC) 14, notification logic 11 within the MSC 14 can send a new DTAP request message 275, which contains a similar indicator to that of the SETUP message in mobile-terminating calls, to receiving logic 24 within the MS 20, using the respective LCS layers 238 shown in FIG. 3 of the drawings, to cause alerting logic 28 within the MS 20 to activate an alerting tone, e.g., ringing or beeping, on the MS 20. Preferably, the request message 275 contains an identity parameter 276 indicating the identity of the requesting Location Application (LA) 280, which is displayed on a display 27 of the MS 20. The new message 275 is preferably referred to as DTAP_LCS_POSITION_SETUP.

In one embodiment, prior to sending the request message 275 to the MS 20, comparison logic 30 within the MSC 14 can first determine whether the MS 20 subscriber has subscribed to positioning services, e.g., Location Services (LCS). If the MS 20 subscriber does subscribe to LCS, the MSC 14 can also compare LA identity information contained within the MS 20 subscriber's SLPP 255, which is stored within a Visitor Location Register (VLR) 16 associated with the MSC 14, with the LA identity of the requesting LA 280, which is provided with the received positioning request 285, to verify that the MS 20 subscriber does allow positioning to be performed by that requesting LA 280. It should be understood that the LCS and SLPP 255 information is downloaded to the serving VLR 16 associated with the serving MSC 14 together the rest of the mobile subscriber's subscription information with the existing Mobile Application Part (MAP) operation INSERT_SUBSCRIBER_DATA or with the existing MAP operation RESTORE_DATA when the MS 20 registers with the serving MSC 14. If determination logic 35 within the MSC 14 determines that positioning of the MS 20 is not allowed for whatever reason, rejection logic 40 within the MSC 14 rejects the positioning request 285 and sends a rejection message 295 to the requesting LA 280.

Alternatively, the MSC 14 can send the request message 275 without first checking LCS and SLPP 255 information.

In either case, once the request message 275 is sent, timer logic 45 within the MSC 14 initiates a new timer 19 to limit the time that the MS 20 has to respond to the request message 275. The mobile subscriber associated with the MS 20 can accept or reject the positioning request based upon the LA identity displayed on the display 27 of the MS 20, using response logic 50 within the MS 20. The response message can be returned to additional receiving logic 55 within the MSC 14 in either a DTAP_LCS_POSITION_CONFIRMED message 277, if positioning is accepted, or in a DTAP_LCS_POSITION_REJECTED message 278, if positioning is rejected.

The mobile subscriber associated with the MS 20 can pre-program the response logic 50 within the MS 20 to respond immediately to the request message 275 with either the accept message 277 or the reject message 278. Alternatively, the mobile subscriber can manually enable the response logic 50 to accept or reject the positioning request 285 after the LA 280 identity is displayed on the MS display 27 by depressing function keys 21 on the MS 20 to select the desired response message, e.g., either accept 277 or reject 278.

If the MS 20 does not respond to the request message 275 before the expiration of the timer 19, activation logic 60 within the MSC 14 activates a default response 17 stored within the MSC 14. Typically, this default response 17 would be to reject the positioning request 285 in order to protect the privacy of the mobile subscriber. If the MS 20 or MSC 14 rejects the positioning request 285, the rejection logic 40 within the MSC 14 sends the rejection message 295 to the requesting LA 280. However, if the MS 20 or MSC 14 (if the default is accept) accepts the positioning request 285, positioning logic 65 within the MSC 14 continues with the positioning of the MS 20. In addition, if the MS 20 returns an accepted message 277, the MS 20 can indicate that positioning is occurring by playing a characteristic beep tone.

Figure 5:
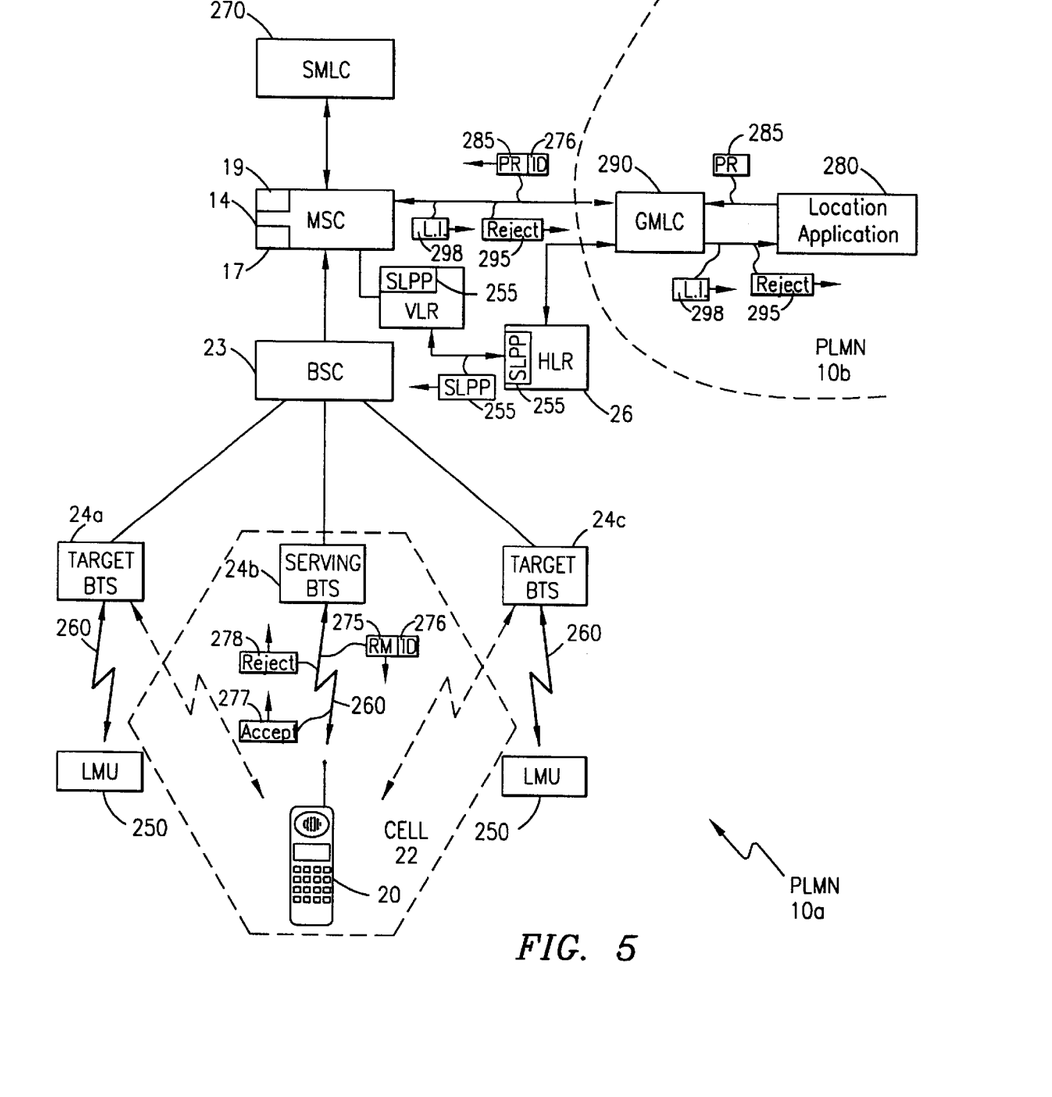
FIG. 5 is a block diagram illustrating aspects involved in positioning a mobile station that has received the notification message in accordance with embodiments of the present invention.
Figure 6:
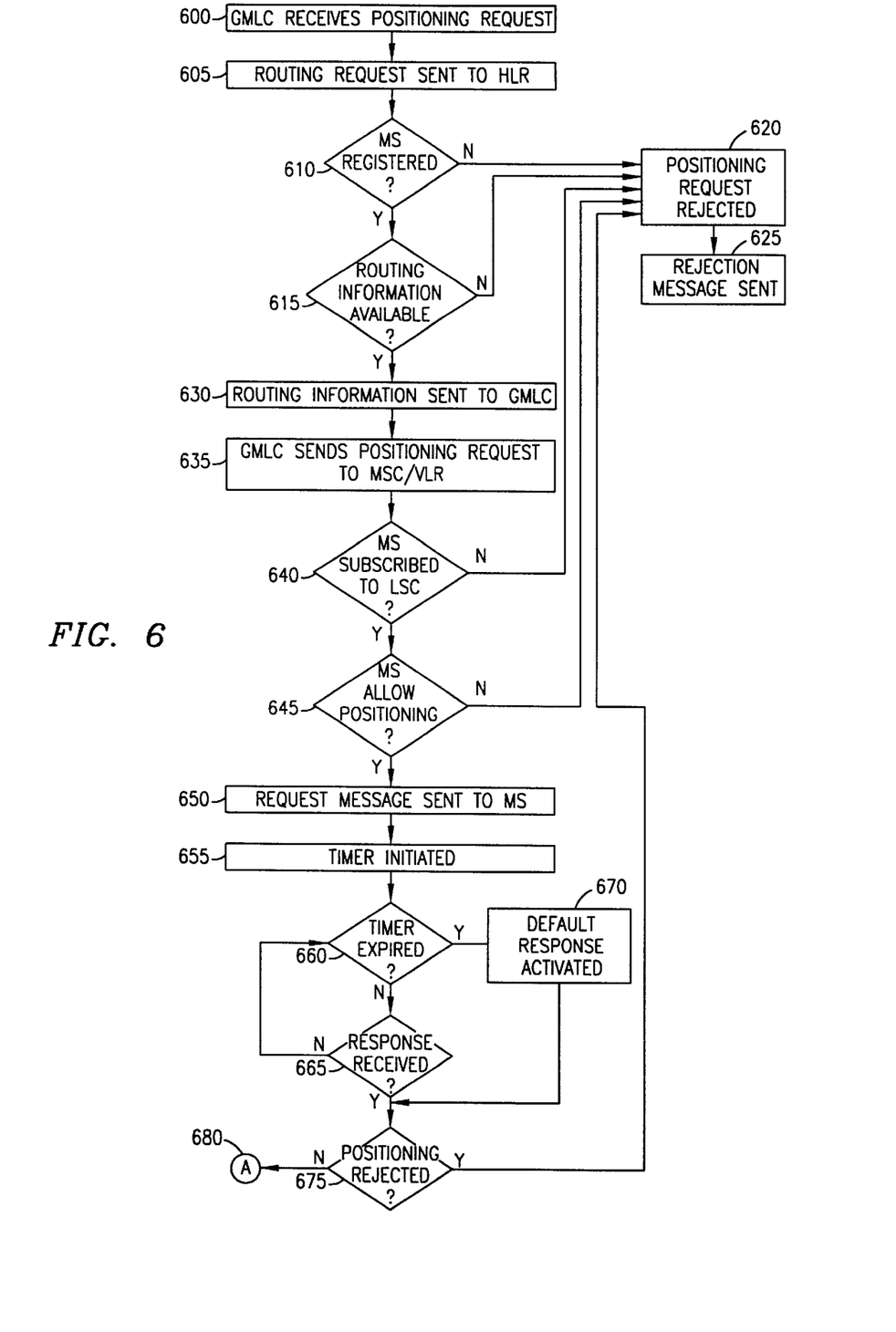
FIG. 6 shows steps in a sample implementation of the sending of the notification message in accordance with embodiments of the present invention.

A more complete understanding of aspects of the present invention will be described with reference to FIG. 5 of the drawings, which will be described in connection with the steps listed in FIGS. 6 and 7 of the drawings. Positioning of a particular target MS 20 typically begins by a Location Application (LA) 280 sending a positioning request 285, which specifies the particular Mobile Station Integrated Services Digital Network (MSISDN) number associated with the particular target MS 20 to be positioned, to a Gateway Mobile Location Center (GMLC) 290 within the Public Land Mobile Network (PLMN) 10b of the LA 280 (step 600).

When the GMLC 290 receives the positioning request 285 (step 600), the GMLC 290 sends a request for routing information (step 605), e.g., the address of the serving MSC 14 within the PLMN 10a that the MS 20 is currently located in, to the MS's Home Location Register (HLR) 26, using the MS's 20 directory number as a global title. The signaling network, e.g., the Signaling System #7 (SS7) network (not shown), can perform a global title translation on the MSISDN and route the request to the appropriate HLR 26 for the MS 20.

The HLR 26 checks its records to confirm that the MS 20 is registered in the HLR 26 (step 610), and that routing information for that MS 20 is available (step 615). If the MS 20 is not registered in the HLR 26 (step 610) or the routing information is not available (step 615), the positioning request 285 is rejected (step 620) and the GMLC 290 sends a rejection message 295 to the requesting LA 280 (step 625).

However, if the MS 20 is registered in the HLR 26 (step 610) and routing information for the MSC 14 is available (step 615), the routing information, e.g., the MSC 14 address is sent to the GMLC 290 (step 630). Using this MSC 14 address, the GMLC 290 transmits a MAP_PROVIDE_SUBSCRIBER_LOCATION message to the serving MSC 14 (step 635), which contains the positioning request 285, the identity parameter 276 of the requesting LA 280 and the International Mobile Subscriber Identity (IMSI) number (not shown) associated with the MS 20 to be positioned.

Upon receipt of the positioning request 285, in one embodiment, the MSC 14 can first verify that the MS 20 allows positioning by checking whether the MS 20 subscriber has subscribed to LCS (step 640). If not, the MSC 14 rejects the positioning request 285 (step 620) and sends a rejection message 295 to the requesting LA 280 via the GMLC 290 (step 625). If so, the MSC 14 can also check whether the MS 20 subscriber's SLPP 255 prevents that particular requesting LA 280 from positioning the MS 20 (step 645). For example, the MSC 14 can check the SLPP 255 to determine whether the requesting LA 280 is listed within the SLPP 255. If the LA 280 is listed in the SLPP 255, and the conditions for that LA 280 are satisfied, the MSC 14 transmits the request message 275 (step 650). However, if the conditions are not satisfied, the positioning request 285 is rejected (step 620) and the MSC 14 sends a rejection message 295 to the requesting LA 280 via the GMLC 290 indicating that the conditions for positioning have not been met (step 625).

In an alternative embodiment, the MSC 14 can send the new request message 275 (step 650), including the identity parameter 276, to the MS 20 without first checking the SLPP 255 (step 645). The request message 275 can be sent from the MSC 14 to the MS 20 using the LCS layers 238 (shown in FIG. 3 of the drawings) within the MSC 14 and the MS 20. When the MS 20 receives the request message 275, in preferred embodiments, a "positioning alert beep tone" is activated on the MS 20 and the identity of the LA 280 is displayed on the MS 20.

It should be noted that the sending of the request message 275 is optional to the network 10a, and shall only be applicable for commercial LA's 280, i.e., a request message 275 will not be sent if the requesting LA 280 is an emergency application or a law enforcement application, due to the override capability that these type of applications have. In addition, the sending of the request message 275 can be a value-added service with regard to LCS's that the mobile subscriber can subscribe to. However, such notification services shall be subject to roaming limitations, i.e., certain network operators may not support it.

Upon the sending of the request message 275 (step 650), the MSC 14 initiates a new timer 19 (step 655) to limit the time that the MS 20 has to respond to the notification message 275. As discussed hereinbefore, the mobile subscriber associated with the MS 20 can either pre-program the MS 20 to respond (step 665) immediately to the request message 275 with either the accept message 277 or the reject message 278, or the mobile subscriber can manually accept 277 or reject 278 the positioning request 285 after the LA 280 identity is displayed on the MS 20.

If the MS 20 does not respond (step 665) to the request message 275 before the expiration of the timer 19 (step 660), a default response 17 stored within the MSC 14 (step 670) is activated. Typically, this default response 17 would be the reject message 278 to protect the privacy of the mobile subscriber. However, the default response 17 can be established by the network operator to be either accept or reject.

if the mobile subscriber or MSC 14 response is to reject the positioning request 285 (step 675), the MSC 14 rejects the positioning request 285 (step 620) and sends the rejection message 295 (step 625) to the requesting LA 280 via the GMLC 290. However, if the MS 20 or MSC 14 accepts the positioning request 285 (step 675), positioning of the MS 20 continues (step 680, shown in FIGS. 6 and 7 of the drawings).

Figure 7:
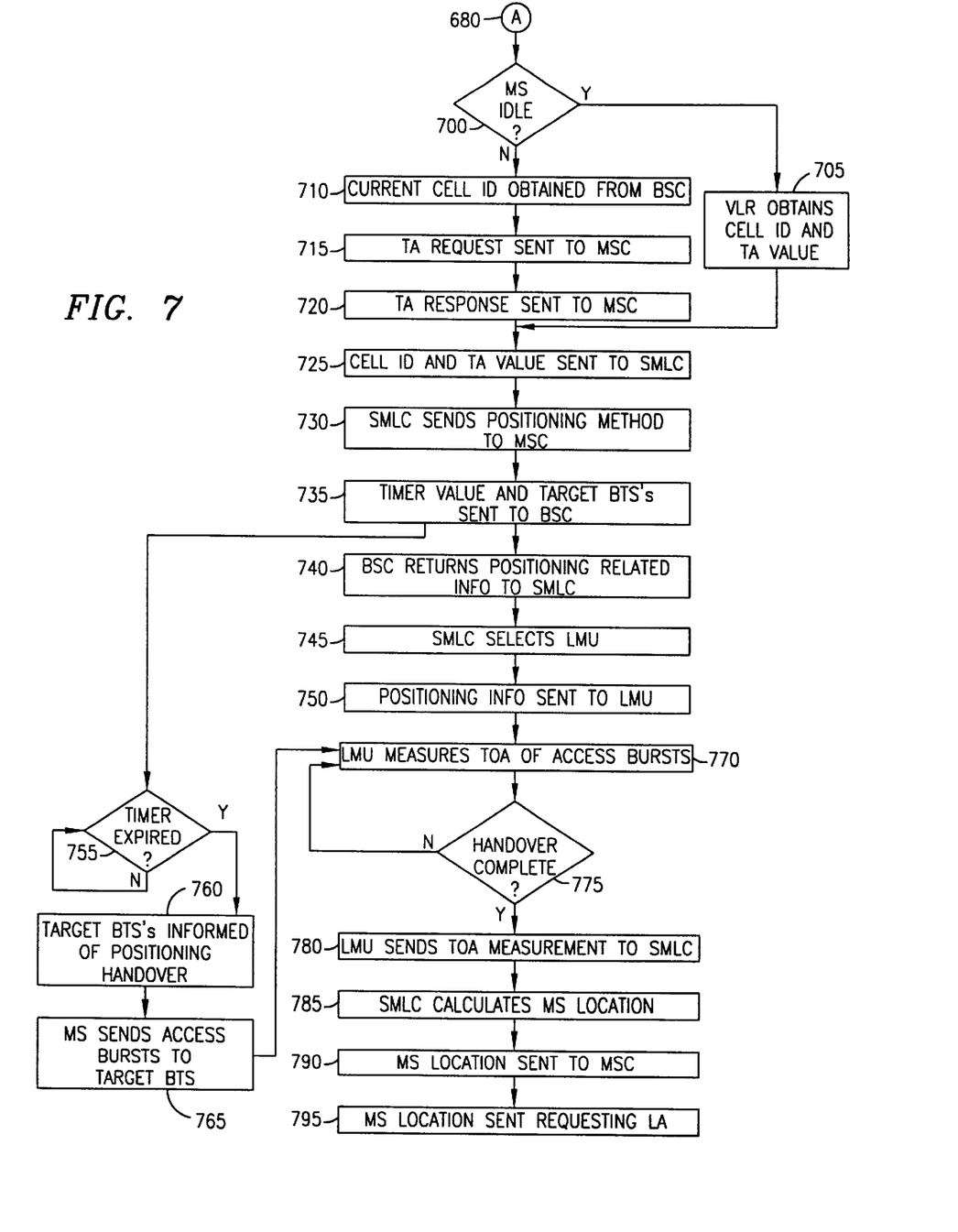
FIG. 7 shows steps in a sample positioning of a mobile station after the notification message has been received and accepted by the mobile station in accordance with embodiments of the present invention.

With reference now to FIG. 7 of the drawings, if the MS 20 is in idle mode (step 700), the VLR 16 performs paging and authentication of the MS 20, along with ciphering of the positioning data. This procedure provides the current cell 22 ID and Timing Advance (TA) value for a serving Base Transceiver Station (BTS) 24b in a BSSMAP Complete layer 3 message, which is used to convey a paging response (step 705). However, if the MS 20 is in dedicated mode (step 700), e.g., involved in a call connection, the MSC 14 obtains the current cell 22 ID from a serving Base Station Controller (BSC) 23 (step 710) and sends a BSSMAP TA request to the serving BSC 23 (step 715). The serving BSC 23 obtains a current TA value from the serving BTS 24b and returns this current TA value in a BSSMAP TA response to the MSC 14 (step 720).

Upon receipt of the current cell 22 ID and TA value (step 705 or 720), the MSC 14 sends a MAP_PERFORM_LOCATION message, which includes the current cell 22 ID and TA value, to the SMLC 270 associated with the MS's 20 current cell 22 location (step 725). The SMLC 270 determines the positioning method to use, e.g., Time of Arrival (TOA), Enhanced Observed Time Difference (E-OTD) or Global Positioning System (GPS). If, for example, TOA is selected, the SMLC 270 sends a MAP Channel Information message, which contains an indication that TOA should be used along with a list of target BTS's 24a and 24c to which a positioning handover must be performed, to the MSC 14 (step 730). In response, the MSC 14 sends a BSSMAP CHANNEL INFORMATION message to the BSC 23, requesting a physical channel description of the allocated traffic channel, if the MS 20 is in dedicated mode. The BSSMAP CHANNEL INFORMATION message also includes a timer value (not shown) and the list of target BTS's 24a and 24c (step 735). The BSC 23 returns the physical channel description and other related information to the SMLC 270 via the MSC 14 (step 740).

Based upon this received information (step 740), the SMLC 270 selects at least one Location Measurement Unit (LMU) 250 to measure and transmit positioning data to the SMLC 270 (step 745). Positioning data measurement information, which includes the identity of at least one target BTS 24a to which a positioning handover must be performed, is sent to the selected LMU 250 via the MSC 14 over the air interface 260 (step 750).

At the expiration of the timer value in the BSC 23 (step 755), the BSC 23 informs the target BTS's 24a and 24c that a positioning handover needs to be performed (step 760). Taking one target BTS 24a, the BSC 23 sends a command to the MS 20 via the serving BTS 24b over the air interface 260 to transmit a HANDOVER ACCESS message, including access bursts, to the target BTS 24a (step 765). During the time that the MS 20 is waiting for a response from the target BTS 24a, e.g., around 320 milliseconds for a traffic channel, the LMU 250 measures the TOA of the access bursts sent by the MS 20 (step 770). After the target BTS 24a indicates to the BSC 23 in a HANDOVER DETECTION message that the required number of access bursts was received, and the MS 20 sends a HANDOVER COMPLETE message to the BSC 23 (step 775), the LMU 250 sends the TOA measurements to the SMLC 270 via the MSC 14 (step 780). Using these TOA measurements and the previously obtained TA value, the SMLC 270 calculates the location of the MS 20 (step 785) and transmits this location information 298 to the MSC 14 (step 790), which can forward this location information 298 to the requesting LA 280 via the GMLC 290 (step 795).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for providing notification of a received positioning request to a mobile subscriber and allowing said mobile subscriber to accept or reject said positioning request, comprising:

a mobile switching center for receiving said positioning request and sending a request message to accept or reject said positioning request to said mobile subscriber; and a mobile station associated with said mobile subscriber and in wireless communication with said mobile switching center, said mobile station receiving said request message, activating an alert tone on said mobile station to alert said mobile subscriber to said received positioning request and transmitting a response message indicating acceptance or rejection of said positioning request by said mobile subscriber to said mobile switching center prior to the location of said mobile station being calculated.

2. The telecommunications system of claim 1, wherein said response message is a DTAP_LCS_POSITION_CONFIRMED message.

3. The telecommunications system of claim 1, wherein said response message is a DTAP_LCS_POSITION_REJECTED message.

4. The telecommunications system of claim 1, wherein said mobile switching center further comprises:

a timer for indicating the amount of time said mobile station has to send said response message.

5. The telecommunications system of claim 4, wherein said mobile switching center further comprises:

activation logic for activating a default response stored within said mobile switching center when said timer expires and said response message has not been received, said default response indicating acceptance or rejection of said positioning request.

6. The telecommunications system of claim 1, wherein said request message includes an identity parameter associated with a location node that originally sent said positioning request, and wherein said mobile station further comprises:

a display for displaying said identity parameter.

7. A method for notifying a mobile station that a positioning request for said mobile station has been received by a mobile switching center in wireless communication with said mobile station, comprising the steps of:

receiving, by said mobile switching center, said positioning request for said mobile station;

sending a request message from said mobile switching center to said mobile station in response to said positioning request, said request message notifying said mobile station of said received positioning request; and receiving a response message from said mobile station indicating acceptance or rejection of said positioning request by said mobile station prior to the location of said mobile station being calculated.

8. The method of claim 7, further comprising the step of:

receiving, by a visitor location register associated with said mobile switching center, privacy positioning information associated with said mobile station.

9. The method of claim 8, further comprising the step of:

comparing, by said mobile switching center, said privacy positioning information with identity information associated with a requesting node that originally sent said positioning request, said identity information being included in said received positioning request.

10. The method of claim 9, further comprising the step of:

determining whether said privacy positioning information allows said requesting node to position said mobile station.

11. The method of claim 10, further comprising the steps of:

rejecting, by said mobile switching center, said positioning request when said privacy positioning information does not allow said location node to position said mobile station; and sending a rejection message to said location node.

12. The method of claim 10, further comprising the step of:

performing, by said mobile switching center, positioning of said mobile station responsive to said positioning request and said response message when said privacy positioning information allows said requesting node to position said mobile station.

13. The method of claim 7, further comprising the step of:

initiating a timer within said mobile switching center, said timer indicating the amount of time said mobile station has to send said response message.

14. The method of claim 13, further comprising the step of:

activating a default response stored within said mobile switching center when said timer expires and said response message has not been received, said default response indicating acceptance or rejection of said positioning request.

15. A method for allowing a mobile station to accept or reject a positioning request received by a mobile switching center in wireless communication with said mobile station, comprising the steps of:

receiving, by said mobile station, a request message from said mobile switching center;

activating an alerting tone on said mobile station, said alerting tone indicating to a mobile subscriber associated with said mobile station that said positioning request was received by said mobile switching center; and sending a response message to said mobile switching center indicating acceptance or rejection of said positioning request by said mobile subscriber prior to the location of said mobile station being calculated.

16. The method claim 15, wherein said step of receiving said request message further comprises the step of:

receiving said notification message including an identity parameter associated with a location node that originally sent said positioning request.

17. The method of claim 16, further comprising the step of:

displaying said identity parameter on said mobile station.

18. The method of claim 15, wherein said step of sending said response message further comprises the step of:

pre-programming said mobile station to send said response message substantially immediately upon receipt of said request message.

19. The method of claim 15, wherein said step of sending said response message further comprises the step of:

depressing function keys manually on said mobile station, by said mobile subscriber, to indicate said response message to be sent to said mobile switching center.

20. A method for providing notification of a positioning request to a mobile subscriber and allowing said mobile subscriber to accept or reject said positioning request, comprising the steps of:

receiving, by a mobile switching center, said positioning request;

sending a request message including said positioning request to a mobile station associated with said mobile subscriber and in wireless communication with said mobile switching center;

activating an alerting tone on said mobile station, said alerting tone indicating to a mobile subscriber associated with said mobile station that said positioning request was received by said mobile switching center; and sending a response message from said mobile station to said mobile switching center indicating acceptance or rejection of said positioning request by said mobile subscriber prior to the location of said mobile station being calculated.

21. The method of claim 20, further comprising the step of:

initiating a timer within said mobile switching center, said timer indicating the amount of time said mobile station has to send said response message.

22. The method of claim 21, further comprising the step of:

activating a default response stored within said mobile switching center when said timer expires and said response message has not been received, said default response indicating acceptance or rejection of said positioning request.

23. The method of claim 20, wherein said step of sending said request message further comprises the step of:

sending said request message including an identity parameter associated with a location node that originally sent said positioning request.

24. The method of claim 23, further comprising the step of:

displaying said identity parameter on said mobile station.

* * * * *